US012603503B2

(12) United States Patent　　　　(10) Patent No.:　US 12,603,503 B2

Katsumata　　　　　　　　　　　　(45) Date of Patent:　　Apr. 14, 2026

(54) INFORMATION PROCESSING SYSTEM AND INFORMATION PROCESSING METHOD FOR MATCHING A POWER-FEEDING VEHICLE AND A SELECTED AREA SELECTED BY A USER OF THE POWER-FEEDING VEHICLE FROM A PLURALITY OF OFF-GRID AREA

(71) Applicant: TOYOTA JIDOSHA KABUSHIKI KAISHA, Toyota (JP)

(72) Inventor: Ryohei Katsumata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 18/242,577

(22) Filed: Sep. 6, 2023

(65) Prior Publication Data

US 2024/0088663 A1　　　Mar. 14, 2024

(30) Foreign Application Priority Data

Sep. 13, 2022　　(JP) ................................. 2022-145298

(51) Int. Cl.
*H02J 3/32*　　　　　(2026.01)
(52) U.S. Cl.
CPC ................................... *H02J 3/322* (2020.01)
(58) Field of Classification Search
CPC ...... H02J 3/322; Y02T 10/70; Y02T 10/7072; Y02T 90/12; Y02T 90/167; G06Q 50/06; G06Q 10/103

USPC .......................................................... 700/297
See application file for complete search history.

(56) References Cited

U.S. PATENT DOCUMENTS

| 2018/0186246 A1* | 7/2018 | Kudo ...................... B60L 58/16 |
| 2019/0288347 A1* | 9/2019 | Yokoyama .............. B60L 50/60 |
| 2021/0053458 A1 | 2/2021 | Fujiwara et al. |
| 2021/0284039 A1* | 9/2021 | Ando ...................... H04W 4/44 |
| 2021/0300202 A1 | 9/2021 | Ogawa |

FOREIGN PATENT DOCUMENTS

| JP | 2019-146436 A | 8/2019 |
| JP | 2020-134487 A | 8/2020 |
| JP | 2021-158837 A | 10/2021 |

* cited by examiner

*Primary Examiner* — Jigneshkumar C Patel
(74) *Attorney, Agent, or Firm* — Dinsmore & Shohl LLP

(57)　　　　　ABSTRACT

An information processing system includes: a vehicle that can feed power to outside; a plurality of off-grid terminals that each manage power of a corresponding one of a plurality of off-grid areas; and a server. The server transmits information of the plurality of off-grid areas to the vehicle, and when information of a selected area selected by a user of the vehicle from the plurality of off-grid areas is received from the vehicle, the server performs a matching process for matching the vehicle and the selected area with each other, and transmits, to the vehicle, information instructing to feed power to the selected area.

9 Claims, 8 Drawing Sheets

1

ELECTRICALLY POWERED VEHICLE 100

OFF-GRID TERMINAL 200

SERVER 300

CONTROL UNIT ~310

STORAGE UNIT ~320

COMMUNICATION UNIT ~330

ELECTRICALLY POWERED VEHICLE

OFF-GRID TERMINAL

FIG.7

POWER-FEEDING AREA CANDIDATE INFORMATION LIST

| POWER-FEEDING TARGET CANDIDATE LOCATION | AREA LOCATION | AREA REGIONALITY | DISTANCE TO AREA | POWER-FEEDING REWARD | POWER-RECEIVING FEE | MANAGEMENT FEE |
|---|---|---|---|---|---|---|
| OFF-GRID AREA A | Pa | RURAL AREA | Da | Fa | Ea | Ma |
| OFF-GRID AREA B | Pb | RURAL AREA | Db | Fb | Eb | Mb |
| OFF-GRID AREA C | Pc | URBAN AREA | Dc | Fc | Ec | Mc |

1

INFORMATION PROCESSING SYSTEM AND INFORMATION PROCESSING METHOD FOR MATCHING A POWER-FEEDING VEHICLE AND A SELECTED AREA SELECTED BY A USER OF THE POWER-FEEDING VEHICLE FROM A PLURALITY OF OFF-GRID AREA

CROSS REFERENCE TO RELATED APPLICATIONS

This nonprovisional application is based on Japanese Patent Application No. 2022-145298 filed on Sep. 13, 2022 with the Japan Patent Office, the entire contents of which are hereby incorporated by reference.

BACKGROUND

Field

The present disclosure relates to an information processing system and an information processing method.

Description of the Background Art

Japanese Patent Laying-Open No. 2020-134487 discloses an information processing apparatus that selects, from a plurality of locations in demand, a location to or from which a vehicle is to discharge or receive power. The information processing apparatus acquires information of location and traveling route of the vehicle and information of power facilities installed in the plurality of locations in demand, and selects, from the plurality of locations in demand based on the acquired information, a location to or from which the vehicle is to discharge or receive power.

SUMMARY

In an area that is not connected to a power transmission network of a power company or an area that generates and consumes substantially a whole of power by itself without relying on a power company (hereinafter also referred to as an "off-grid area"), when an amount of consumed power in the area becomes excessively larger than an amount of generated power therein, power shortage may occur. On the other hand, an electrically powered vehicle (hereinafter, also referred to as a "power-feeding vehicle") that can feed power to outside can be moved to such an off-grid area and can feed power to the area. Therefore, it is desired to construct a platform that promotes to feed power from a power-feeding vehicle to an off-grid area.

However, in the conventional technology, a user of a power-feeding vehicle cannot know what options exist with regard to an off-grid area to which power is to be fed. That is, the user of the power-feeding vehicle also has a preference for an off-grid area to which power is to be fed (the user prefers an off-grid area located in a closer distance, the user prefers an off-grid area that accepts a higher power selling price, the user prefers an off-grid area that can be fed with power on the user's way to a destination, or the like); however, in the conventional technology, the user of the power-feeding vehicle cannot freely select, at the user's discretion, an off-grid area to which power is to be fed.

The present disclosure has been made to solve the above-described problem and has an object to allow a user of a power-feeding vehicle to freely select, at the user's discretion, an off-grid area to which power is to be fed.

(Item 1) An information processing system according to the present disclosure includes: a power-feeding vehicle; a plurality of area terminals that each manage power of a corresponding one of a plurality of off-grid areas; and a server configured to communicate with the power-feeding vehicle and the plurality of area terminals. The server transmits information of the plurality of off-grid areas to the power-feeding vehicle, and when information of a selected area selected by a user of the power-feeding vehicle from the plurality of off-grid areas is received from the power-feeding vehicle, the server performs a matching process for matching the power-feeding vehicle and the selected area with each other, and transmits, to the matched power-feeding vehicle, information instructing to feed power to the selected area.

According to the above configuration, the information of the plurality of off-grid areas is transmitted to the power-feeding vehicle. Therefore, the user of the power-feeding vehicle can know what options exist with regard to an off-grid area to which power is to be fed, and then can freely select, at the user's discretion, an off-grid area to which power is to be fed.

(Item 2) In the information processing system according to item 1, the information of the plurality of off-grid areas includes information about an amount of reward to be obtained by the user of the power-feeding vehicle in response to the power being fed to each of the plurality of off-grid areas by the power-feeding vehicle.

According to the above configuration, the user of the power-feeding vehicle can know the amount of reward to be obtained in response to the power being fed to the off-grid area, and then can select the off-grid area to which the power is to be fed.

(Item 3) In the information processing system according to item 2, the server sets the amount of reward to a larger amount as a distance from the power-feeding vehicle to each of the off-grid areas is longer.

According to the above configuration, in view of such a fact that a difficulty (cost, time, effort, or the like) required for the power-feeding vehicle to move to the off-grid area is greater as the distance from the power-feeding vehicle to the off-grid area is longer, the amount of reward is set to be larger as the distance from the power-feeding vehicle to the off-grid area is longer. Therefore, even when the distance from the power-feeding vehicle to the off-grid area is long, the feeding of power to the off-grid area can be effectively promoted.

(Item 4) In the information processing system according to item 1, the information of the plurality of off-grid areas includes information about a location of each of the plurality of off-grid areas.

According to the above configuration, the user of the power-feeding vehicle can know the location of the off-grid area to which the power is to be fed, and then can select the off-grid area to which the power is to be fed.

(Item 5) In the information processing system according to item 4, the information of the plurality of off-grid areas includes information for distinguishing whether each of the plurality of off-grid areas is located in an urban area or a rural area.

According to the above configuration, the user of the power-feeding vehicle can know the regionality of the off-grid area (whether it is located in an urban area or a rural area) and then can select the off-grid area to which the power is to be fed.

(Item 6) In the information processing system according to item 5, the server sets an amount of reward for feeding the power to an off-grid area in the rural area to an amount larger than an amount of reward for feeding the power to an off-grid area in the urban area.

According to the above configuration, in view of such a fact that the number of power-feeding vehicles nearby in the rural area is smaller than that in the urban area and a value of receiving power from a power-feeding vehicle is high in the rural area, the amount of reward for feeding the power to the off-grid area in the rural area is set to be larger than the amount of reward for feeding the power to the off-grid area in the urban area. Therefore, the feeding of power to the off-grid area in the rural area can be effectively promoted.

(Item 7) In the information processing system according to item 1, the server registers, in advance, information about a power feeding condition for which the user of the power-feeding vehicle permits to feed the power to an off-grid area, and the server transmits, to the power-feeding vehicle, information of an off-grid area that satisfies the power feeding condition.

According to the above configuration, the user of the power-feeding vehicle registers, in advance, the power feeding condition desired by the user, with the result that the user can know what options exist with regard to an off-grid area that satisfies the power feeding condition.

(Item 8) In the information processing system according to item 1, when it is confirmed that the matched power-feeding vehicle has fed the power to the selected area, the server collects a compensation for the feeding of the power from the selected area, and performs a settlement process for paying a reward to the user of the power-feeding vehicle having fed the power.

According to the above configuration, the server having performed the matching process can also perform the settlement process for the feeding of the power.

(Item 9) In the information processing system according to item 1, the server receives a degree of satisfaction for the matching process from an area terminal of the selected area, and the server feeds back the received degree of satisfaction to a next matching process.

According to the above configuration, the degree of satisfaction of the user of the off-grid area for the matching process can be improved.

(Item 10) An information processing method according to the present disclosure is an information processing method performed by a server configured to communicate with a power-feeding vehicle and a plurality of area terminals that each manage power of a corresponding one of a plurality of off-grid areas, the information processing method including: transmitting information of the plurality of off-grid areas to the power-feeding vehicle; and when information of a selected area selected by a user of the power-feeding vehicle from the plurality of off-grid areas is received from the power-feeding vehicle, performing a matching process for matching the power-feeding vehicle and the selected area with each other, and transmitting, to the matched power-feeding vehicle, information instructing to feed power to the selected area.

According to the above configuration, the same function and effect as those of item 1 can be exhibited.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram showing an exemplary power-feeding area candidate information list created by the server.

DESCRIPTION OF THE EMBODIMENTS

Hereinafter, embodiments of the present disclosure will be described in detail with reference to figures. It should be noted that in the figures, the same or corresponding portions are denoted by the same reference symbols and will not be described repeatedly.

<System Configuration>

Figure 1:
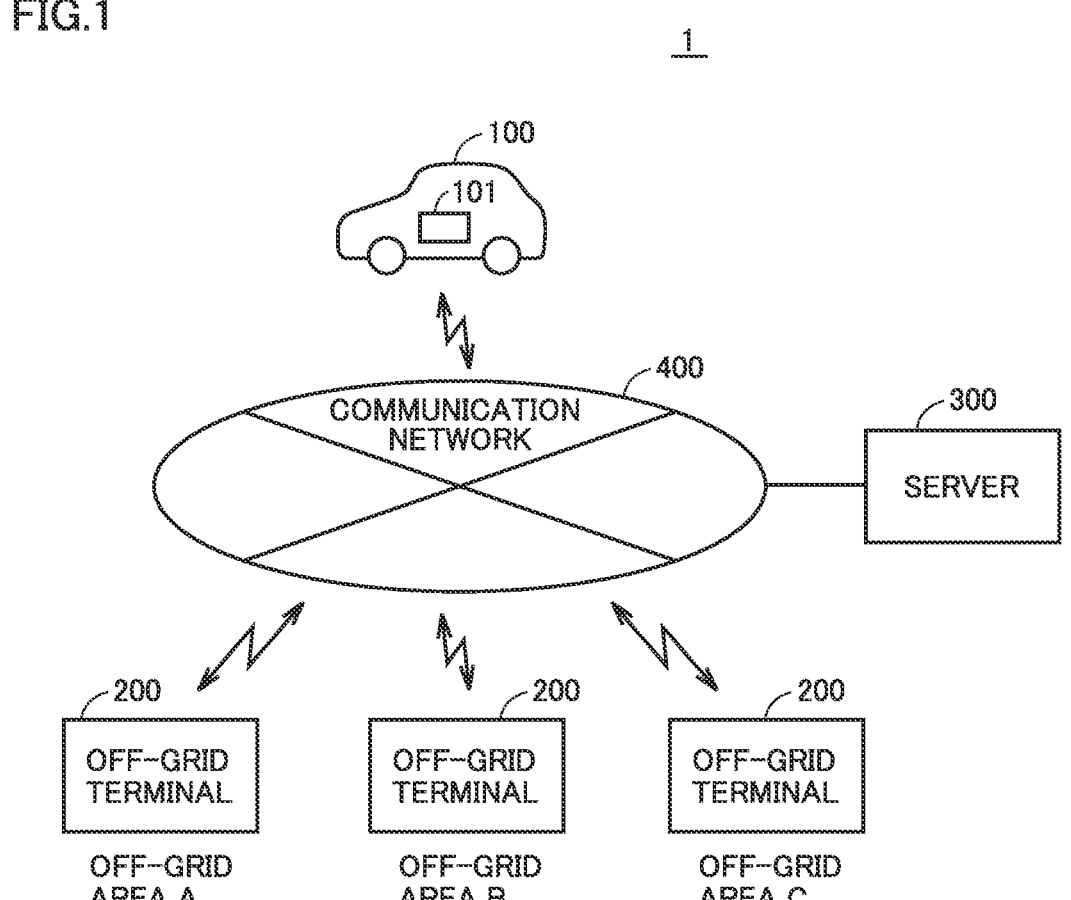
FIG. 1 is a diagram schematically showing an overall configuration of an information processing system.

FIG. 1 is a diagram schematically showing an overall configuration of an information processing system 1 according to the present embodiment. Information processing system 1 includes a vehicle 100, a plurality of off-grid terminals 200, and a server 300. Vehicle 100, the plurality of off-grid terminals 200, and server 300 can communicate with one another via a communication network 400 such as the Internet or a telephone network.

Vehicle 100 is an electrically powered vehicle (battery electric vehicle, hybrid electric vehicle, fuel cell electric vehicle, or the like) that has a traveling battery 101 mounted thereon and that generates driving force for traveling using electric power of traveling battery 101. Further, vehicle 100 can charge traveling battery 101 using power supplied from outside of the vehicle (for example, a power transmission network of a power company). Further, vehicle 100 can supply power of traveling battery 101 to outside of the vehicle.

Each of off-grid terminals 200 is a terminal device to be manipulated by a user of an off-grid area. As described above, the off-grid area is an area that is not connected to a power transmission network of a power company or an area that generates and consumes substantially a whole of power by itself without relying on a power company. In the off-grid area, for example, power generated in the area using renewable energy or the like is temporarily stored in a power storage device, and the power stored in the power storage device is consumed in the area. The user of the off-grid area can manipulate off-grid terminal 200 to transmit information about the off-grid area to server 300.

Server 300 communicates with vehicle 100 and the plurality of off-grid terminals 200 so as to provide the information about each off-grid area to vehicle 100.

Figure 2:
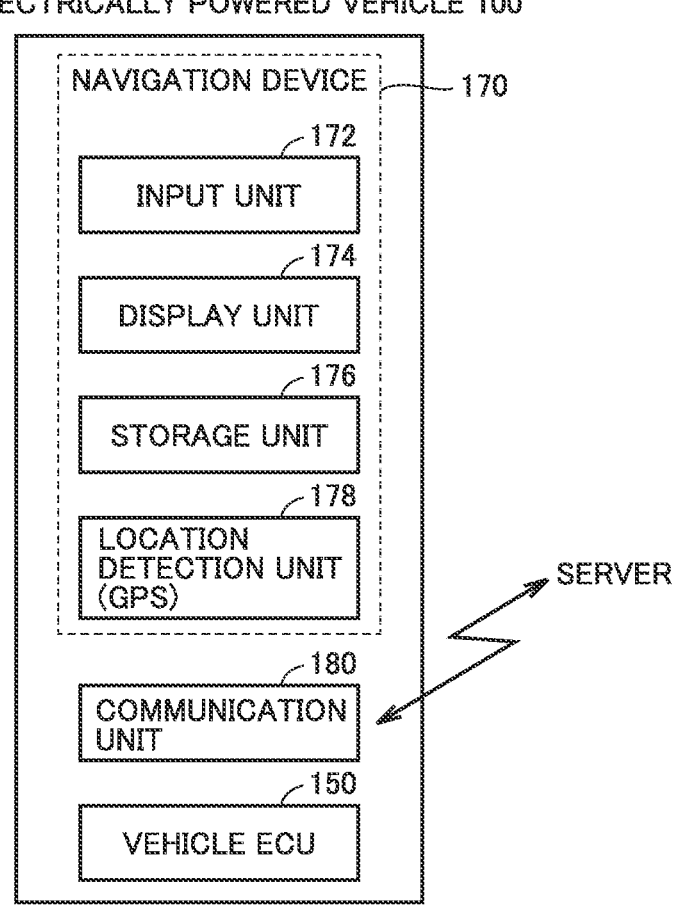
FIG. 2 is a block diagram schematically showing an exemplary configuration of a vehicle.

FIG. 2 is a block diagram schematically showing an exemplary configuration of vehicle 100. Vehicle 100 includes a vehicle ECU (Electronic Control Unit) 150, a navigation device 170, and a communication unit 180.

Although not shown in FIG. 2, vehicle ECU 150 includes a CPU (Central Processing Unit), a storage device, and an input/output buffer, receives an signal from each sensor or the like, outputs a control signal to each device, and controls each device in vehicle 100.

As shown in FIG. 2, navigation device 170 includes an input unit 172, a display unit 174, a storage unit 176, and a location detection unit 178. Navigation device 170 uses map information stored in storage unit 176 and location information of vehicle 100 detected by a GPS (Global Positioning System) of location detection unit 178 so as to display the current location of vehicle 100 on a map to the user and perform a guide to a destination.

Display unit 174 is constituted of, for example, a liquid crystal panel, and displays the current location of vehicle 100 or various information from vehicle ECU 150. Input unit 172 is constituted of a touch panel, a switch, or the like, and receives a manipulation by the user.

Communication unit 180 is an interface for communicating with server 300 via communication network 400. Communication unit 180 can communicate with server 300 via communication network 400 as described above.

Figure 3:
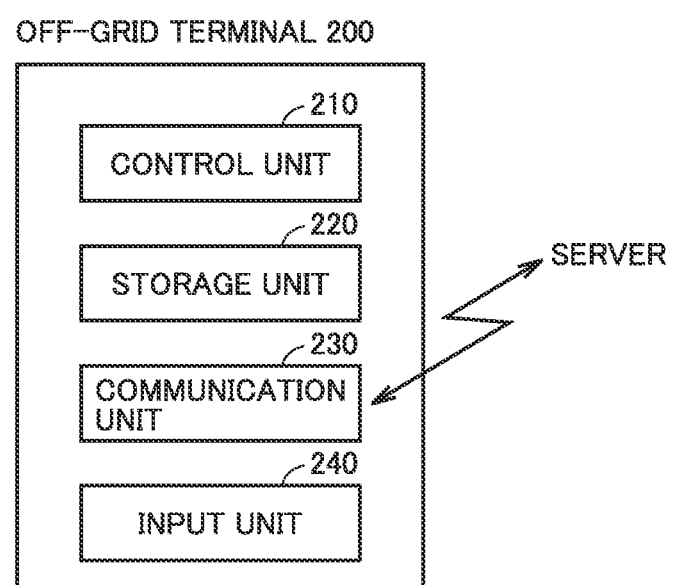
FIG. 3 is a block diagram schematically showing an exemplary configuration of an off-grid terminal.

FIG. 3 is a block diagram schematically showing an exemplary configuration of each off-grid terminal 200. Off-grid terminal 200 includes a control unit 210, a storage unit 220, a communication unit 230, and an input unit 240.

Communication unit 230 is an interface for communicating with server 300 via communication network 400. Storage unit 220 stores the location information of the off-grid area managed by off-grid terminal 200.

Input unit 240 is an input interface for receiving a manipulation by the user of the off-grid area.

Control unit 210 transmits, from communication unit 230 to server 300, information stored in storage unit 220 or information input to input unit 240.

Figure 4:
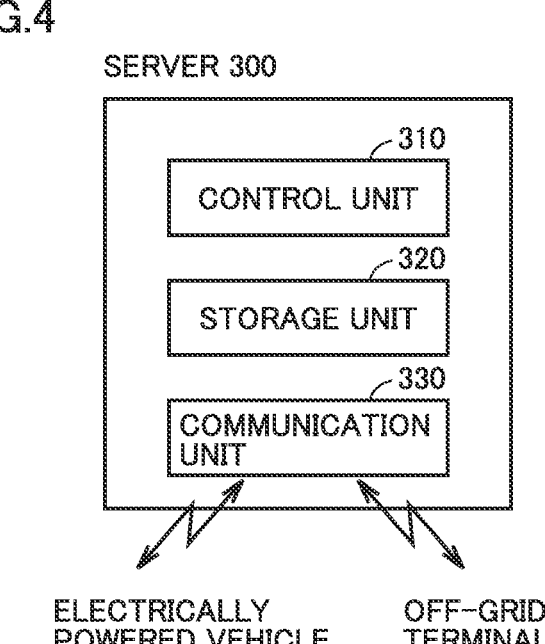
FIG. 4 is a block diagram schematically showing an exemplary configuration of a server.

FIG. 4 is a block diagram schematically showing an exemplary configuration of server 300. Server 300 includes a control unit 310, a storage unit 320, and a communication unit 330.

Communication unit 330 is an interface for communicating with vehicle 100 and the plurality of off-grid terminals 200 via communication network 400. Storage unit 320 stores information received from vehicle 100, information received from off-grid terminal 200, and the like.

Based on the information received from vehicle 100, the information received from off-grid terminal 200, and the information stored in storage unit 320, control unit 310 performs a matching process, a settlement process, and the like as described later.

<Matching Between Power-Feeding Vehicle and Off-Grid Area>

Since each off-grid area is not connected to the power transmission network of the power company, when an amount of consumed power in the area becomes excessively larger than an amount of generated power therein, power shortage may occur. On the other hand, vehicle 100 capable of feeding power to outside can be moved to the off-grid area and can feed power to the area.

Therefore, when an off-grid area (also referred to as "power-receiving-requesting off-grid area") that requests to receive power from outside and a vehicle 100 that is permitted to feed power to outside (hereinafter also referred to as "power-feeding-permitted vehicle") can be matched with each other, the power of vehicle 100 can be effectively used as the power of the off-grid area.

However, the user of the power-feeding-permitted vehicle also has a preference for an off-grid area to which power is to be fed (the user prefers an off-grid area located in a closer distance, the user prefers an off-grid area that accepts a higher power selling price, the user prefers an off-grid area that can be fed with power on the user's way to a destination, or the like).

In view of this point, information processing system 1 according to the first embodiment performs matching between the power-feeding-permitted vehicle and the power-receiving-requesting off-grid area. On this occasion, information processing system 1 presents, to the user of the power-feeding-permitted vehicle, what options exist with regard to an off-grid area to which power is to be fed, so as to allow the user of the power-feeding-permitted vehicle to freely select, at the user's discretion, an off-grid area to which the power is to be fed.

Figure 5:
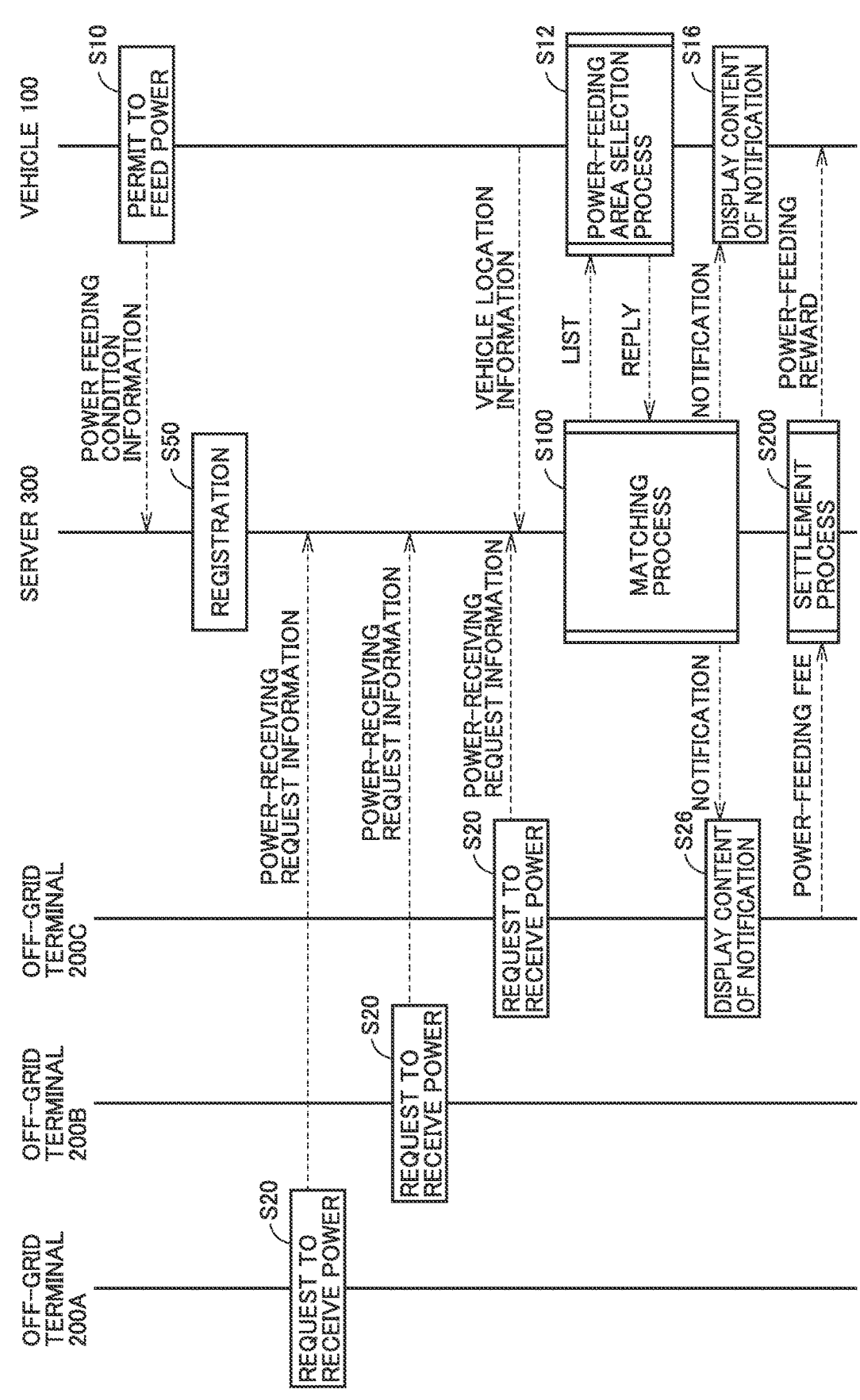
FIG. 5 is a sequence diagram showing exemplary processes performed by the off-grid terminal, the server, and the vehicle.

FIG. 5 is a sequence diagram showing exemplary processes performed by off-grid terminal 200 in each off-grid area that requests to receive power, server 300, and vehicle 100 permitted to feed power. It should be noted that for simplicity of description, FIG. 5 shows an example in which three off-grid terminals 200A, 200B, 200C that respectively manage three off-grid areas A, B, C, and one vehicle 100 communicate with server 300.

When permitting feeding of power to an off-grid area, vehicle 100 transmits power-feeding permission information to server 300 (step S10). The power-feeding permission information includes information such as a vehicle ID for specifying vehicle 100, the current location of vehicle 100, and a lower limit (hereinafter also referred to as a "reward lower-limit amount") of an amount of reward for permitting feeding of power to an off-grid area.

When the power-feeding permission information is received from vehicle 100, server 300 performs a registration process of storing the received power-feeding permission information into storage unit 320 (step S50).

When requesting to receive power from the power-feeding-permitted vehicle, off-grid terminal 200A transmits power-receiving request information to server 300 (step S20). The power-receiving request information includes information such as the location of off-grid area A and an upper limit (hereinafter also referred to as "fee upper-limit amount") of an amount of fee that can be paid for receiving power from a power-feeding-permitted vehicle. Similarly, when off-grid terminal 200B also requests to receive power from the power-feeding-permitted vehicle, off-grid terminal 200B transmits power-receiving request information to server 300 (step S20). The same applies to off-grid terminal 200C (step S20).

When server 300 receives the power-receiving request information from each of off-grid terminals 200A to 200C during a period of time from the reception of the power-feeding permission information from vehicle 100 until a predetermined period elapses, server 300 sets vehicle 100 to a "power-feeding vehicle", sets each of off-grid areas A to C to a "power-feeding area candidate", and performs a "matching process" of matching the power-feeding vehicle with one of the three power-feeding area candidates (step S100).

In the matching process, server 300 creates a "power-feeding area candidate information list" indicating information of the power-feeding vehicle and the power-feeding area candidates. Server 300 transmits the generated power-feeding area candidate information list to the power-feeding vehicle so as to inquire the user of the power-feeding vehicle as to which one of off-grid areas A to C included in the list is to be selected as a target to which power is to be fed.

The power-feeding vehicle having received the inquiry displays, on display unit 174, the power-feeding area candidate information list received from server 300 so as to allow the user to select one of off-grid areas A to C included in the power-feeding area candidate information list, and replies, to server 300, information indicating the off-grid area selected by the user (step S12). The process of step S12 is hereinafter also referred to as a "power-feeding area selection process".

Server 300 sets the off-grid area replied by the power-feeding vehicle to a "selected area" and matches the set selected area with the power-feeding vehicle.

Then, server 300 notifies, to the matched power-feeding vehicle, matching determination information instructing to feed power to the selected area. Further, server 300 notifies off-grid terminal 200 (off-grid terminal C in the example shown in FIG. 6) of the matched selected area that vehicle 100 has been matched therewith.

The power-feeding vehicle having received the notification of the matching determination information from server 300 displays, on display unit 174, the content of the matching determination information (step S16). Similarly, off-grid terminal 200 (off-grid terminal C in the example shown in FIG. 6) having received the notification from server 300 displays, on the display unit (not shown), the received content (step S26).

With such a series of processes, the user of vehicle 100 serving as the power-feeding vehicle can know what options exist with regard to an off-grid area to which power is to be fed, and then can freely select, at the user's discretion, the off-grid area to which power is to be fed.

When it is thereafter confirmed that the matched power-feeding vehicle has been actually moved to the selected area and has fed power to the selected area, server 300 collects "power-receiving fee" from the user of the selected area as a compensation for receiving power from the power-feeding vehicle, and performs a "settlement process" for paying a "power-feeding reward" to the user of the power-feeding vehicle as a reward for feeding the power to the selected area (step S200). Thus, server 300 having performed the matching process can also perform the settlement process for the feeding of power.

Figure 6:
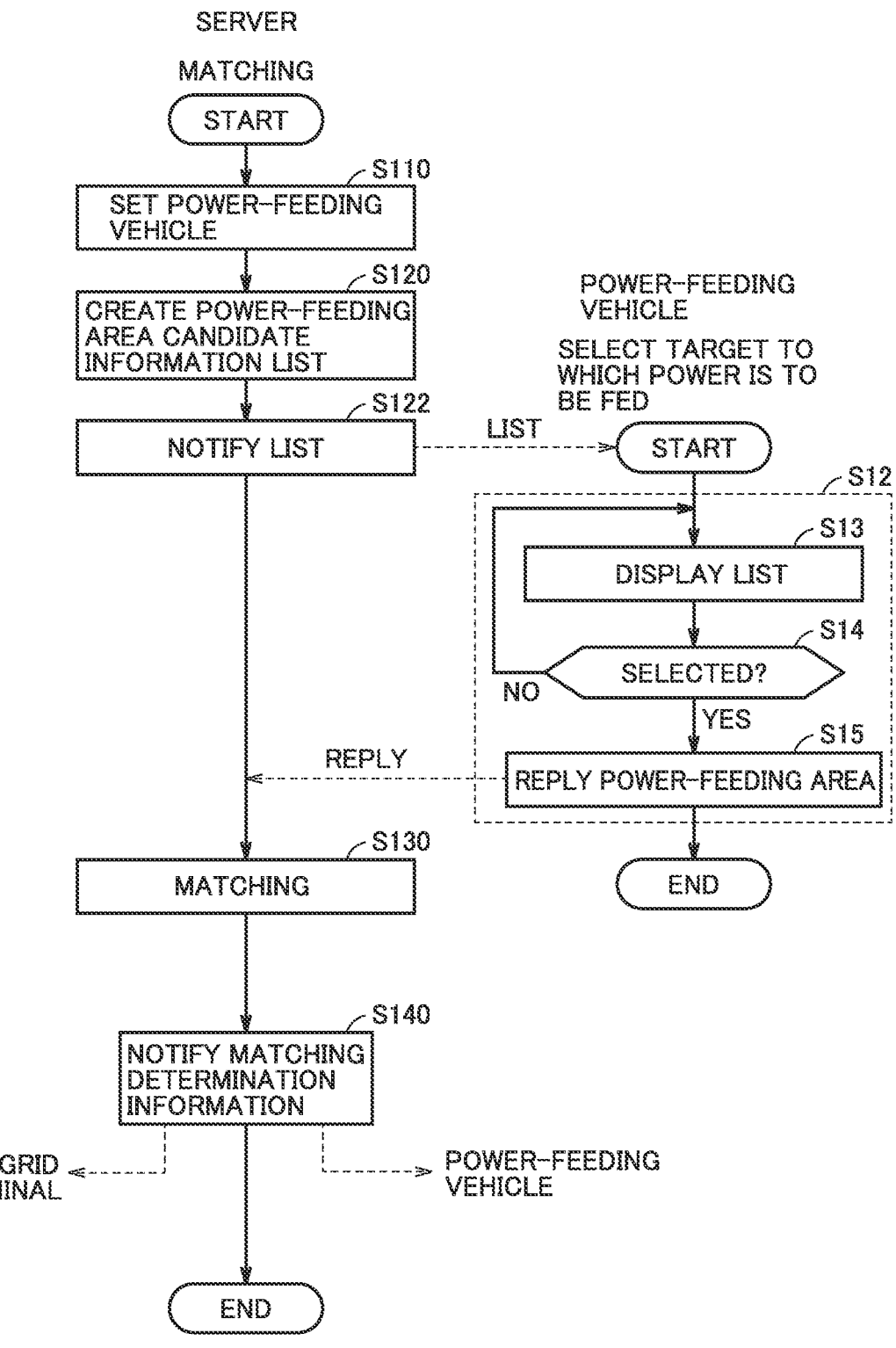
FIG. 6 is a flowchart showing an exemplary detailed procedure of each of a matching process performed by the server and a power-feeding area selection process performed by the vehicle.

FIG. 6 is a flowchart showing an exemplary detailed procedure of each of the "matching process" (step S100 in FIG. 5) performed by server 300 and the "power-feeding area selection process" (step S12 in FIG. 5) performed by vehicle 100. In FIG. 6, the process performed by server 300 is shown on the left side, and the process performed by vehicle 100 serving as the power-feeding vehicle is shown on the right side.

Server 300 starts the process of this flowchart in response to, as a trigger, elapse of a predetermined period of time from the reception of the power-feeding permission information from vehicle 100, for example.

Server 300 first sets vehicle 100 specified by the power-feeding permission information to the "power-feeding vehicle" (S110).

Next, server 300 creates the above-described "power-feeding area candidate information list" (step S120). Server 300 extracts off-grid area(s) that each satisfy a previously registered power feeding permission condition for vehicle 100 from a plurality of off-grid areas each having transmitted the power-receiving request information, and creates the "power-feeding area candidate information list" based on information of the off-grid area(s) that each satisfy the power feeding permission condition. Therefore, since the user of vehicle 100 has registered the power feeding permission condition in server 300 in advance, information of an off-grid area that does not satisfy the power feeding permission condition (for example, an area that is too far away from the vehicle) can be excluded and only information of an off-grid area that satisfies the power feeding permission condition can be included in the "power-feeding area candidate information list".

FIG. 7 is a diagram showing an exemplary power-feeding area candidate information list created by server 300. In the example shown in FIG. 7, the power-feeding area candidate information list includes information of three off-grid areas A to C that each satisfy the power-feeding permission condition. It should be noted that the following mainly describes a process when server 300 has created the power-feeding area candidate information list shown in FIG. 7.

In the power-feeding area candidate information list, items "AREA LOCATION", "AREA REGIONALITY", "DISTANCE TO AREA", "POWER-FEEDING REWARD", "POWER-RECEIVING FEE" and "MANAGEMENT FEE" are generated for each of off-grid areas A to C. The "AREA LOCATION" indicates the location of the off-grid area. The "AREA REGIONALITY" indicates whether each of off-grid areas A to C is located in an urban area or a rural area. The "DISTANCE TO AREA" indicates a distance from vehicle 100 to each of off-grid areas A to C.

The "POWER-FEEDING REWARD" indicates an amount of money to be received by the user of vehicle 100 as a reward for feeding power to each of off-grid areas A to C. The "POWER-RECEIVING FEE" indicates an amount of money to be paid by each of the users of off-grid areas A to C as a compensation for receiving power from vehicle 100. The "MANAGEMENT FEE" indicates an amount of money to be received by server 300 as a service provision fee. Therefore, the total of the power-feeding reward and the management fee is the power-receiving fee.

Server 300 adjusts the amount of the "power-feeding reward" within a range from the reward lower-limit amount desired by the user of vehicle 100 to the fee upper-limit amount desired by the user of the off-grid area (more specifically, an amount obtained by subtracting the management fee from the fee upper-limit amount).

In view of such a fact that a difficulty (cost, time, effort, or the like) required for vehicle 100 to move to the off-grid area is greater as the "DISTANCE TO AREA" is longer, server 300 sets the "POWER-FEEDING REWARD" to a larger amount as "DISTANCE TO AREA" is longer. Thus, even when the distance from vehicle 100 to the off-grid area is long, the feeding of power to the off-grid area can be effectively promoted to the user of vehicle 100.

Further, in view of such a fact that the number of power-feeding vehicles nearby in the rural area is smaller than that in the urban area and a value of receiving power from a power-feeding vehicle is high in the rural area, server 300 sets an amount of reward for feeding power to an off-grid area with the area regionality "RURAL AREA" to an amount larger than an amount of reward for feeding power to an off-grid area with the area regionality "URBAN AREA". This makes it possible to effectively promote the user of vehicle 100 to feed power to the off-grid area in the rural area.

Returning to FIG. 6, server 300 notifies, to vehicle 100 serving as the power-feeding vehicle, the power-feeding area candidate information list (see FIG. 7) generated in step S120, so as to inquire the user of vehicle 100 as to which one of the power-feeding area candidates (off-grid areas A to C) included in the power-feeding area candidate information list is to be selected (step S122).

Vehicle 100 having received this inquiry from server 300 performs the above-described power-feeding area selection process (step S12).

Specifically, vehicle 100 first displays, on display unit 174, the power-feeding area candidate information list received from server 300 (step S13). Thus, when the user of vehicle 100 sees the power-feeding area candidate information list, the user can know the candidates for the off-grid area to which power is to be fed, the location of each area, the amount of reward to be obtained by feeding power to each area, the regionality of each area, and the like, and then can select the off-grid area to which power is to be fed. It should be noted that on this occasion, the location of vehicle 100 (vehicle) and the locations of off-grid areas A to C may be displayed simultaneously on the map screen. By displaying them in this way, a relative location relation between the vehicle and each off-grid area can be intuitively known.

For example, the user of vehicle 100 can select one of the power-feeding area candidates by performing a manipulation of touching one of off-grid areas A to C displayed on the screen of display unit 174.

Vehicle 100 determines whether or not the manipulation of selecting one of the power-feeding area candidates (off-grid areas A to C) has been performed onto input unit 172 by the user (step S14).

When the power-feeding area has been selected (YES in step S14), vehicle 100 replies the selected power-feeding area to server 300 (step S15).

Server 300 having received the reply as to the power-feeding area from vehicle 100 sets, to the "selected area", the power-feeding area that has been replied from vehicle 100 and matches the selected area with vehicle 100 (step S130).

Then, server 300 notifies the matching determination information to each of vehicle 100 and off-grid terminal 200 of the selected area (step S140).

Figure 8:
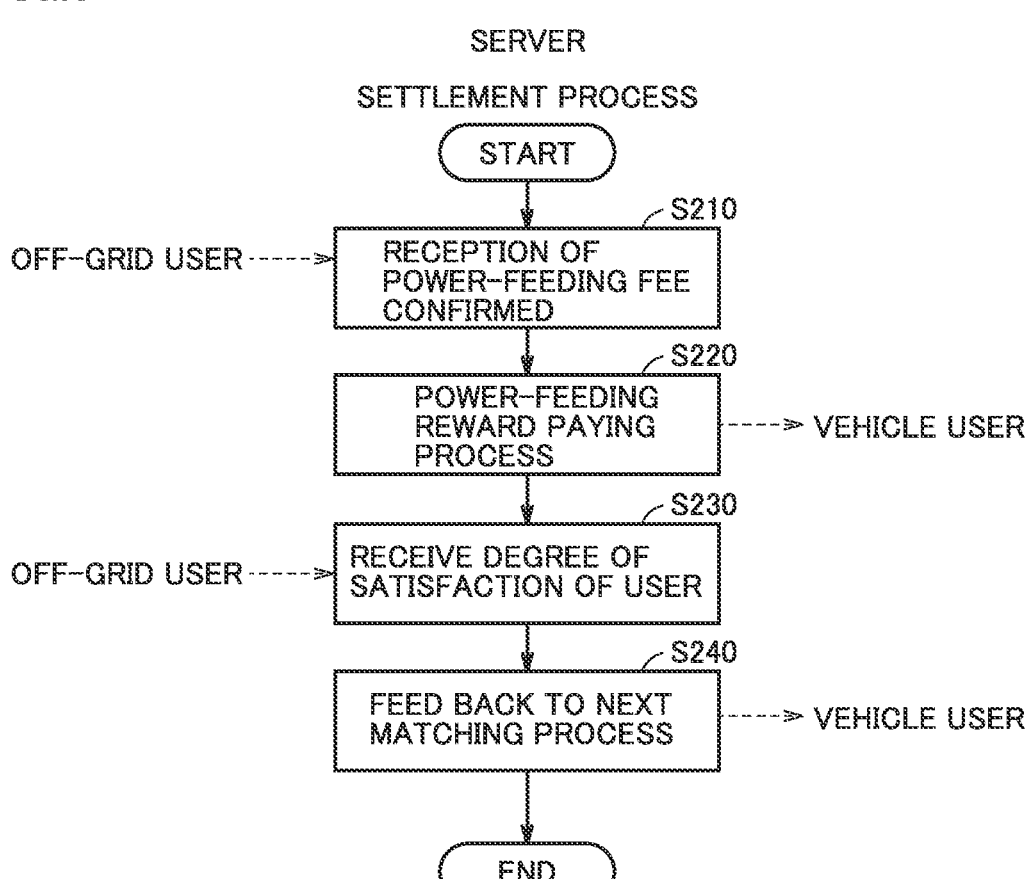
FIG. 8 is a flowchart illustrating an exemplary detailed procedure of a settlement process performed by the server.

FIG. 8 is a flowchart showing an exemplary detailed procedure of the "settling process" (step S200 in FIG. 5) performed by server 300.

First, server 300 performs a process of confirming that a power-feeding fee has been received in a predetermined account from the user of the off-grid area that has actually received power from vehicle 100 (step S210).

Next, server 300 performs a process of paying, to the user of vehicle 100 as the power-feeding reward, an amount obtained by subtracting the management fee from the power-feeding fee (step S220).

Next, from the user of the off-grid area who has paid the power-feeding fee, server 300 receives information indicating a degree of satisfaction of the user for the matching process performed this time (step S230).

Next, server 300 feeds back, to the next matching process, the degree of satisfaction of the user for the matching process performed this time (step S240). For example, when the degree of satisfaction is low with regard to the user of vehicle 100 matched in the matching process performed this time, a measure will be taken in the next matching process, for example, by reducing the number of power-feeding area candidates to be notified to the user. Thus, the degree of satisfaction of the user of the off-grid area for the matching process can be improved.

As described above, server 300 according to the present embodiment transmits, to the power-feeding vehicle, the power-feeding area candidate information list including the information of the plurality of off-grid areas that each desire to receive power. Then, when the information of the selected area selected by the user of the power-feeding vehicle from the power-feeding area candidate information list is received from the power-feeding vehicle, server 300 performs the matching process for matching the power-feeding vehicle and the selected area with each other, and transmits the matching determination information instructing the matched power-feeding vehicle to feed power to the selected area.

According to the above configuration, the user of the power-feeding vehicle can know what options exist with regard to an off-grid area to which power is to be fed, and can freely select, at the user's discretion, the off-grid area to which power is to be fed.

<Modification 1>

In the above-described embodiment, it has been described that one off-grid area is matched with one power-feeding vehicle by the matching process. However, for example, a plurality of off-grid areas may be matched with one power-feeding vehicle.

<Modification 2>

In the above-described embodiment, it has been illustratively described that vehicle 100 is provided with communication unit 180 that can communicate directly with communication network 400.

However, the communication between vehicle 100 and communication network 400 may be performed using a mobile terminal possessed by the user of vehicle 100. Specifically, vehicle 100 may perform a short-range communication with the mobile terminal possessed by the user so as to communicate with communication network 400 via the mobile terminal.

Although the embodiments of the present disclosure have been described and illustrated in detail, it is clearly understood that the same is by way of illustration and example only and is not to be taken by way of limitation, the scope of the present disclosure being interpreted by the terms of the appended claims. The scope of the present disclosure is defined by the terms of the claims, and is intended to include any modifications within the scope and meaning equivalent to the terms of the claims.

What is claimed is:

1. An information processing system comprising:
a power-feeding vehicle;
a plurality of area terminals that each manage power of a corresponding one of a plurality of off-grid areas; and
a server configured to communicate with the power-feeding vehicle and the plurality of area terminals, wherein:
the server transmits information of the plurality of off-grid areas to the power-feeding vehicle,
when information of a selected area selected by a user of the power-feeding vehicle from the plurality of off-grid areas is received from the power-feeding vehicle, the server performs a matching process for matching the power-feeding vehicle and the selected area with each other, and transmits, to the matched power-feeding vehicle, information instructing to feed power to the selected area,
the information of the plurality of off-grid areas includes information about an amount of reward to be obtained by the user of the power-feeding vehicle in response to the power being fed to each of the plurality of off-grid areas by the power-feeding vehicle, and
the server sets the amount of reward to a larger amount as a distance from the power-feeding vehicle to each of the off-grid areas is longer.

2. The information processing system according to claim 1, wherein the information of the plurality of off-grid areas includes information about a location of each of the plurality of off-grid areas.

3. The information processing system according to claim 2, wherein the information of the plurality of off-grid areas includes information for distinguishing whether each of the plurality of off-grid areas is located in an urban area or a rural area.

4. The information processing system according to claim 3, wherein the server sets an amount of reward for feeding the power to an off-grid area in the rural area to an amount larger than an amount of reward for feeding the power to an off-grid area in the urban area.

5. The information processing system according to claim 1, wherein the server registers, in advance, information about a power feeding condition for which the user of the power-feeding vehicle permits to feed the power to an off-grid area, and the server transmits, to the power-feeding vehicle, information of an off-grid area that satisfies the power feeding condition.

6. The information processing system according to claim 1, wherein when it is confirmed that the matched power-feeding vehicle has fed the power to the selected area, the server collects a compensation for the feeding of the power from the selected area, and performs a settlement process for paying a reward to the user of the power-feeding vehicle having fed the power.

7. The information processing system according to claim 1, wherein the server receives a degree of satisfaction for the matching process from an area terminal of the selected area, and the server feeds back the received degree of satisfaction to a next matching process.

8. An information processing method performed by a server configured to communicate with a power-feeding vehicle and a plurality of area terminals that each manage power of a corresponding one of a plurality of off-grid areas, the information processing method comprising:

transmitting information of the plurality of off-grid areas to the power-feeding vehicle; and when information of a selected area selected by a user of the power-feeding vehicle from the plurality of off-grid areas is received from the power-feeding vehicle, performing a matching process for matching the power-feeding vehicle and the selected area with each other, and transmitting, to the matched power-feeding vehicle, information instructing to feed power to the selected area, wherein the information of the plurality of off-grid areas includes information about an amount of reward to be obtained by the user of the power-feeding vehicle in response to the power being fed to each of the plurality of off-grid areas by the power-feeding vehicle, and wherein the server sets the amount of reward to a larger amount as a distance from the power-feeding vehicle to each of the off-grid areas is longer.

9. An information processing system comprising:

a power-feeding vehicle;

a plurality of area terminals that each manage power of a corresponding one of a plurality of off-grid areas; and a server configured to communicate with the power-feeding vehicle and the plurality of area terminals, wherein:

the server transmits information of the plurality of off-grid areas to the power-feeding vehicle, when information of a selected area selected by a user of the power-feeding vehicle from the plurality of off-grid areas is received from the power-feeding vehicle, the server performs a matching process for matching the power-feeding vehicle and the selected area with each other, and transmits, to the matched power-feeding vehicle, information instructing to feed power to the selected area, the information of the plurality of off-grid areas includes information about a location of each of the plurality of off-grid areas, the information of the plurality of off-grid areas includes information for distinguishing whether each of the plurality of off-grid areas is located in an urban area or a rural area, and the server sets an amount of reward for feeding the power to an off-grid area in the rural area to an amount larger than an amount of reward for feeding the power to an off-grid area in the urban area.

* * * * *